United States Patent [19]

Norton et al.

[11] Patent Number: 5,102,274
[45] Date of Patent: Apr. 7, 1992

[54] BLIND FASTENER

[75] Inventors: Merle E. Norton, Anaheim; Felipe Wong, Carson, both of Calif.

[73] Assignee: Textron Inc., Providence, R.I.

[21] Appl. No.: 704,461

[22] Filed: May 23, 1991

[51] Int. Cl.⁵ .................................................. F16B 13/04
[52] U.S. Cl. .......................................... 411/43; 411/70
[58] Field of Search ................ 411/34, 35, 36, 37, 411/38, 43, 44, 45, 55, 49, 70, 72

[56] References Cited

U.S. PATENT DOCUMENTS

| 2,533,448 | 12/1950 | Forman et al. | 411/70 |
|---|---|---|---|
| 2,536,353 | 1/1951 | Cooper | 411/70 |
| 2,538,623 | 1/1951 | Keating | |
| 3,047,181 | 7/1962 | Heidenwolf | |
| 3,073,205 | 1/1963 | Siebol | |
| 3,136,204 | 6/1964 | Reynolds | |
| 3,192,821 | 7/1965 | Siebol | 411/70 |
| 3,257,890 | 6/1966 | Kraemer | 411/43 |
| 3,426,375 | 2/1969 | Jeal | 411/35 X |
| 4,089,249 | 5/1978 | Binns | 411/70 X |
| 4,211,145 | 7/1980 | Dolch | |
| 4,236,429 | 12/1980 | Dolch | |
| 4,913,609 | 4/1990 | Mauer | 411/57 X |

FOREIGN PATENT DOCUMENTS 856808 12/1960 United Kingdom .................. 411/43

OTHER PUBLICATIONS

Brochure, Cherry Division of Textron Publication, pp. 1, 5, 6, 15, 16.

Primary Examiner—Rodney M. Lindsey
Attorney, Agent, or Firm—Knobbe, Martens, Olson & Bear

[57] ABSTRACT

A fastener mandrel has formed on one end a spherically curved shoulder and an elliptically shaped head adjoining the shoulder. In setting the fastener in a workpiece, the shoulder enlarges the end of a tubular rivet and clamps workpieces together in combination with a preformed head on the other end of the rivet. The mandrel head deforms the rivet tail into an elliptical shape that partially encloses the mandrel head to provide good stem retention. A plurality of annular ribs on the mandrel stem are drawn into a reduced diameter section of the rivet head end when the rivet is set, thereby providing additional stem retention.

12 Claims, 5 Drawing Sheets

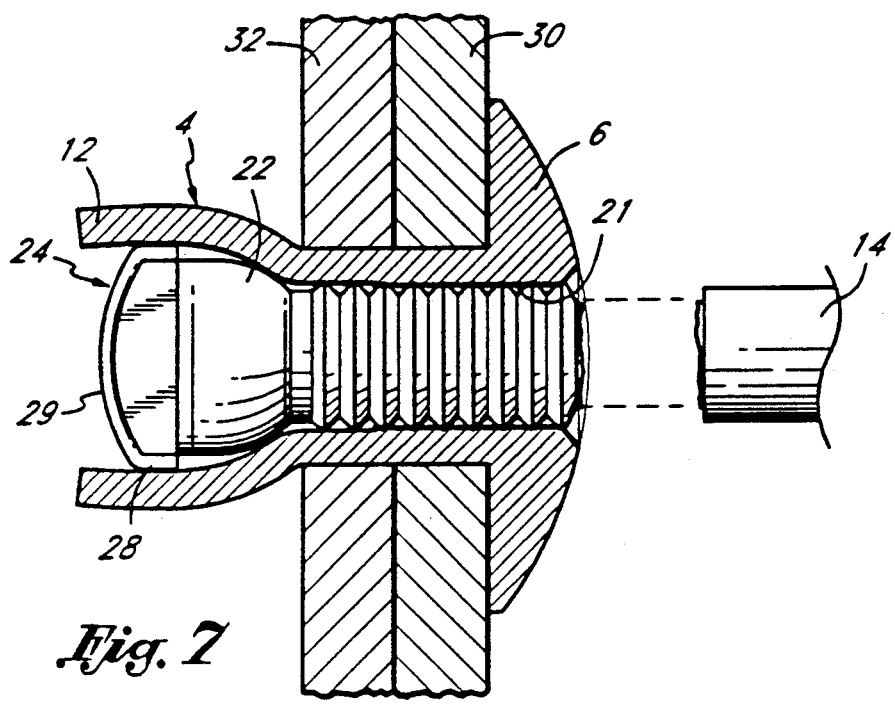
_Fig. 7_
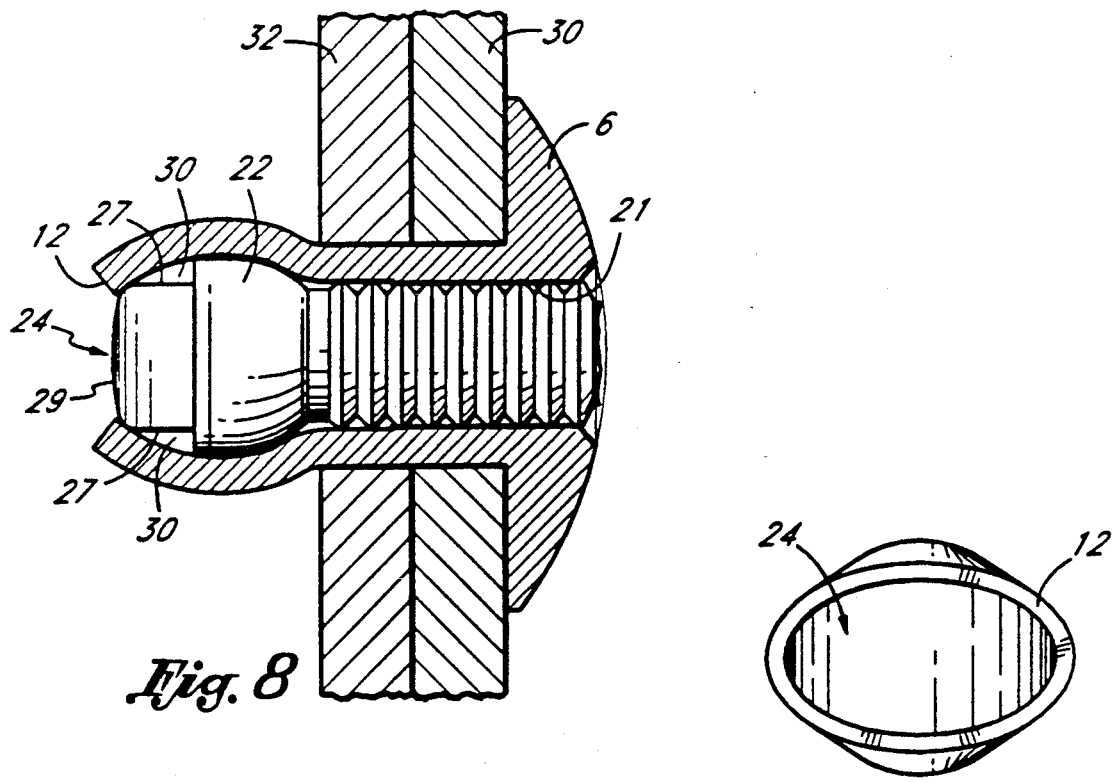
_Fig. 8_
_Fig. 9_

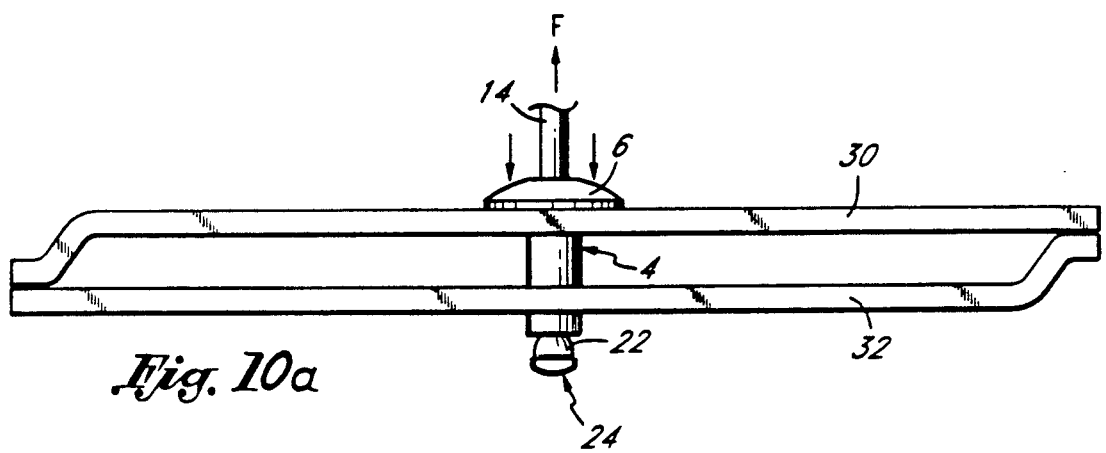
_Fig. 10a_
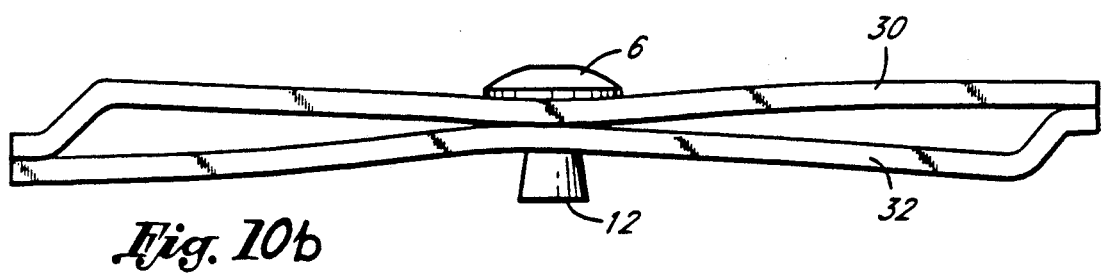
_Fig. 10b_

BLIND FASTENER

FIELD OF THE INVENTION

This invention relates to mechanical fasteners, such as blind rivets, wherein fastener installation is only accessible on one side, although the invention may be useful in non-blind situations as well. More particularly, the invention relates to improved means for retaining a fastener stem head in an installed fastener body.

BACKGROUND OF THE INVENTION

In the installation of a blind rivet, the combination of a tubular fastener body or sleeve with a cylindrical stem therein is inserted through a hole in two or more stacked workpieces. The sleeve typically has a preformed head on one end which engages one side of the combined workpiece and has a plain tubular configuration on its tail end protruding from the opposite side of the workpiece. The stem usually has an enlarged head which engages the end of the fastener sleeve and has an elongated portion protruding beyond the head end of the sleeve to be gripped by an installation tool. The stem is pulled by the tool so that its enlarged head deforms the tail of the sleeve, clamping the workpieces together. When the sleeve is thus set, further pulling on the stem causes it to break flush with the exterior of the sleeve head. Various fasteners perform the workpiece clamp-up aspect with varying degrees of effectiveness.

It is desirable that the portion of the stem extending through the sleeve remain captured in the sleeve in that the stem provides additional shear strength to the fastener, and in many installations it is not acceptable to have loose rivet stems confined within an inaccessible portion of the structure. In a three-piece blind fastener, a locking ring fits into a mating annular groove between the stem and the sleeve to lock the stem in the sleeve. Such a fastener is widely used and has many advantages, one advantage being that a given fastener can accommodate workpieces within a range of workpiece thicknesses in that the stem is wire drawn until a positive stop is reached. These fasteners have also been effective for tightly clamping the workpieces together.

It is desirable that a two-piece fastener, which is naturally less expensive, also provide good clamp-up capabilities, as well as good stem retention. Various attempts have been made at attaining these goals, but only partial success has been obtained.

U.S. Pat. No. 3,047,181—Heidenwolf discloses a two-piece blind fastener having an enlarged tail on its stem which appears to have a frusto-conical forward surface and a spherical rear surface. Such fastener appears to draw the workpieces tightly together, and the patent indicates that ... "the sleeve tail flows over the smooth surface of the terminal, spherical portion of the mandrel or stem and encloses the enlarged tail." However, there is further provided teeth at the extreme outer end of the sleeve to facilitate enclosing of the stem tail.

U.S. Pat. No. 3,073,205—discloses a fastener that appears to provide good workpiece clamp up utilizing an enlarged stem head having a tapered leading surface and the enlarged stem head is captured in the tail of the sleeve. However, the sleeve has an annular groove formed on its inner surface to provide the retention capability. Such a groove, of course, adds to the cost of the structure.

U.S. Pat. No. 4,211,145—Dolch discloses a blind rivet having a stem with an enlarged cone-shaped head, and U.S. Pat. No. 4,236,429—Dolch discloses a spherical tail. In each case, the heads are said to be captured within the end of the sleeve. However, these fasteners are made of thermoplastic material and an inwardly extending annular bead is formed on the extreme end of the sleeve to capture the stem head. It is said that this is accomplished because the thermoplastic material tends to return to its original shape after deforming pressure has been relaxed. For many applications, thermoplastic fasteners are, of course, not acceptable.

A two-piece blind fastener made by the Cherry Division of Textron Inc., and referred to as an "N-rivet," employs a stem having an enlarged head with a generally flat forward surface, a curved convex rear surface and a pair of opposing, generally flattened sides giving the enlarged head a somewhat elliptical cross-sectional shape. When a head with such shape enters the end of the sleeve, the sleeve tail cross section is deformed by being enlarged in the longer dimension of the stem head with the result that the adjacent sides of the sleeve tail are drawn inwardly and tend to curl over the end of the stem head, capturing it within the end of the sleeve. While such fastener is relatively inexpensive and is widely used for many applications, a better, more consistent clamp up of the workpieces is desirable. This is particularly so if such result can be obtained without significant increased cost.

U.S. Pat. Nos. 3,850,021 and 3,880,042—Binns disclose the use of axially spaced, outwardly extending, diametrically and axially spaced flanges on a fastener stem, and such flanges deform the end of a sleeve into non circular shapes. However, it appears difficult to manufacture.

U.S. Pat. No. 3,136,204—Reynolds discloses a two-piece blind fastener wherein a sleeve tail is deformed into a so-called tulip shape by a pin head having a conical surface and a crowned rear surface. The sleeve tail provides some limited stem retention capability, but apparently not enough because the sleeve head is also swaged into grooves on the stem.

U.S. Pat. No. 2,558,623—Keating discloses a two-piece rivet assembly wherein a sleeve has a head section of reduced diameter and sleeve material is swaged into a groove in the stem for stem retention by a larger diameter pin section.

A need still exists for an improved, low cost, two-piece blind fastener having the capability to provide excellent workpiece clamp up, plus good stem retention capability.

SUMMARY OF THE INVENTION

Briefly stated, the present invention comprises a blind fastener having a pull stem with an enlarged head and shoulder on one end uniquely shaped to provide good workpiece clamp-up characteristics and stem retention characteristics. The enlarged shoulder on the stem has an outwardly flaring, preferably spherically curved forward surface that initially engages the tail of the sleeve. When the fastener is being installed, the shoulder enters and enlarges the sleeve while drawing the workpieces together. To the rear of that forward portion there is provided a pair of sleeve expanding lips or protrusions that are diametrically spaced and protrude beyond the periphery of the shoulder. The lips slope rearwardly and inwardly with a generally spherical shape, providing an enlarged head with recesses extending circumferentially between the lips. Pulling the stem sufficiently far to draw the expanding lips into the tail of the sleeve deforms the sleeve tail into a generally elliptical shaped cross section. Further pulling of the stem into the sleeve allows the sleeve ends to curl inwardly into the recesses to enclose and capture the stem head within the sleeve tail.

Additional stem retention is obtained by providing increased interference between serrations on the stem and a reduced inner diameter section of the sleeve in the head end of the sleeve. Preferably, the serrations are annular. This means of stem retention is useful with fasteners having mandrel heads other than the one described in the preceding paragraph.

BRIEF DESCRIPTION OF THE DRAWINGS

FIG. 7 is a cut-away side view of the fastener of FIG. 5 fully installed.

FIG. 8 is a cut-away top view of the fastener of FIG. 5 fully installed.

FIG. 9 is an end view of the rivet tail after installation.

FIG. 10a shows a side elevational view of the fastener in preparation of joining two test strips.

FIG. 10b shows a side elevational view of the fastener after and joining the two strips in FIG. 10a.

DETAILED DESCRIPTION OF THE PREFERRED EMBODIMENT

Figure 1:
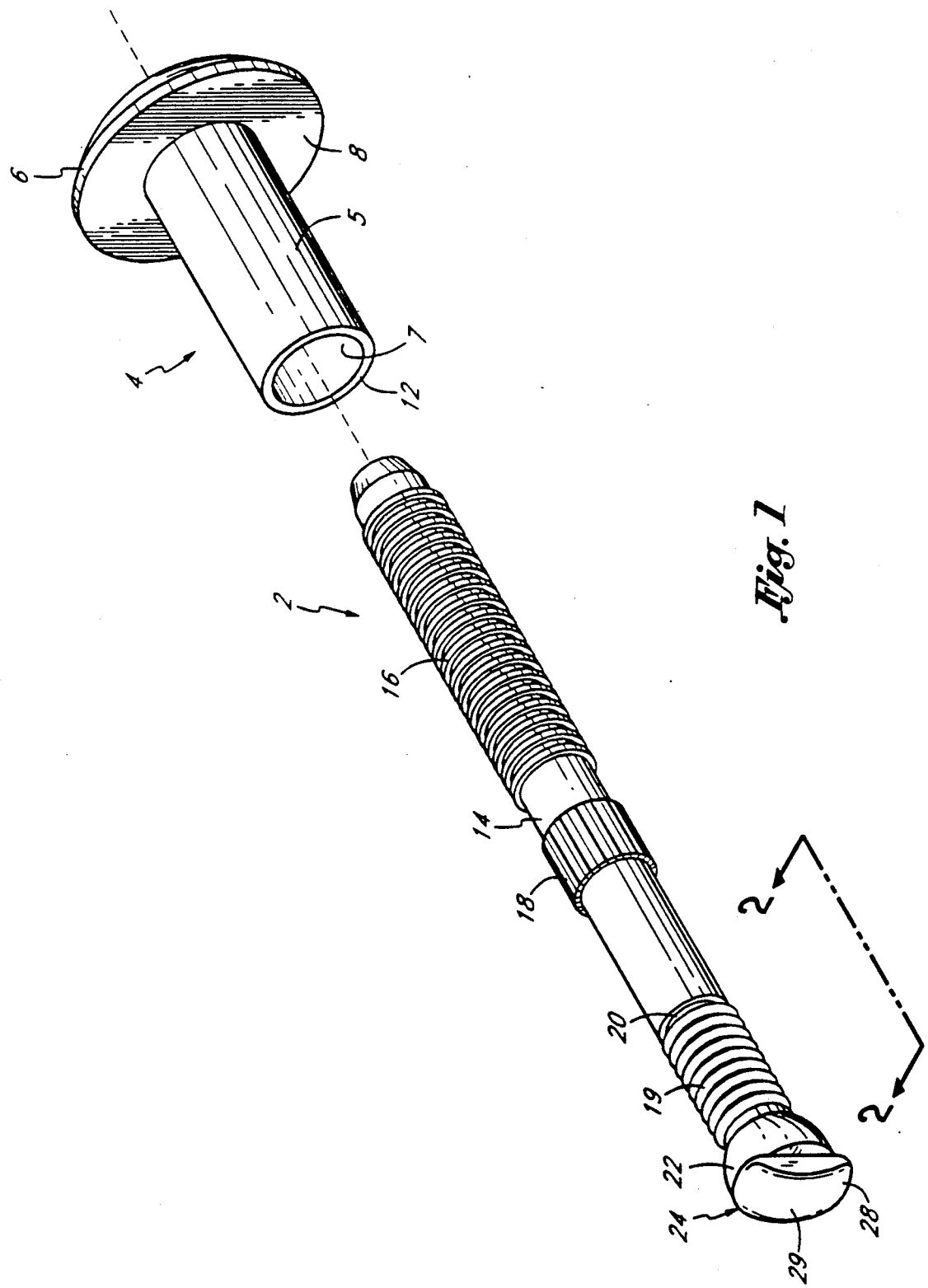
FIG. 1 is an exploded perspective view of a preferred embodiment of the fastener of the present invention.

Referring to FIG. 1, an elongated mandrel 2 is shown aligned with to be inserted through a tubular rivet body or sleeve 4, prior to installation in a workpiece. The rivet 4 includes a tubular shank 5 and an enlarged head 6 on one end, together with a cylindrical tail 12 on the other end. Extending through the rivet shank 5 and head 6 is a cylindrical cavity or bore 7 sized to receive the mandrel 2, which is inserted therein.

The mandrel 2 comprises a long cylindrical stem 14 culminating in a head 24 on one end, with a shoulder 22 between them. The stem includes annular serrations 16 about a substantial portion of the end opposite the head 24, for installation gripping purposes. Adjacent the serrations 16 is an annular band of grooves 18 which extend generally parallel to the stem axis. An annular notch or break groove 20 is located at a distance from the shoulder 22 approximately equal to the thickness of the two parts being joined. Between the break groove 20 and the shoulder 22 is a plurality of annular grooves and ribs, or serrations 19.

The forward surface of the shoulder 22 facing the grooves 19 has a convex, preferably spherical, curvature, with the diameter increasing from the stem 14 to a maximum, where it meets the head 24. Stated differently, the entire shoulder has a generally semi-spherical shape, although there is a short annular band 22a of generally cylindrical shape adjacent the head 24.

Figure 2:
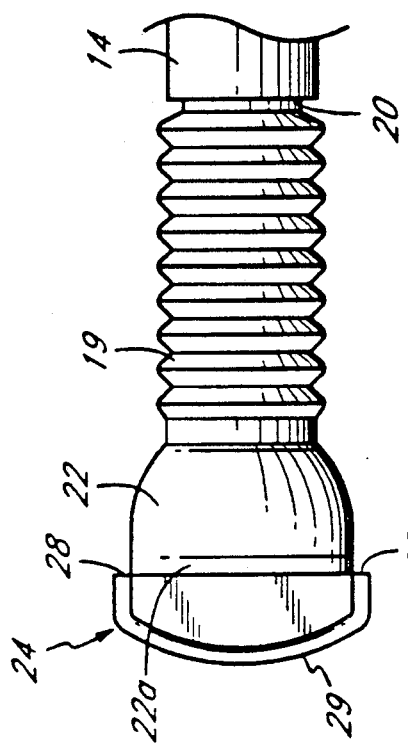
FIG. 2 is an enlarged side elevational view of the head end of the mandrel of FIG. 1.
Figure 3:
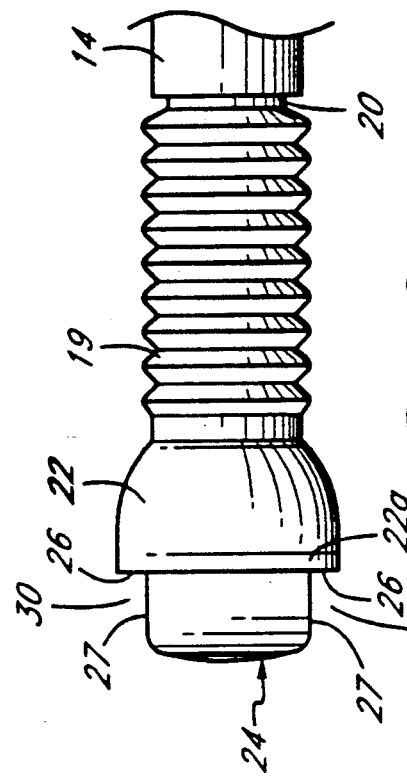
FIG. 3 is an enlarged top view of the mandrel head end.
Figure 4:
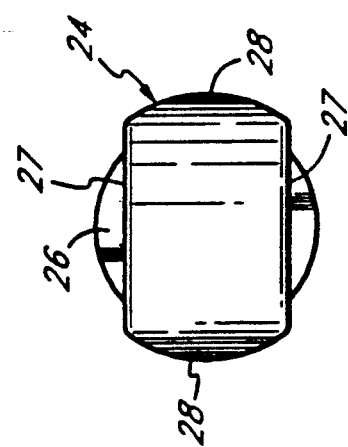
FIG. 4 is an enlarged end view of the mandrel head end.

The head 24, as shown in FIGS. 2, 3 and 4, has a particular shape to facilitate the deformation of the rivet tail upon installation. The shoulder 22 abruptly terminates with a rearwardly facing ledge 26 in two diametrically spaced sides. Each ledge 26 has the shape of a circular segment, as seen in FIG. 4, bounded on its radially inward side by a flat side 27 of the head 24. The head 24 end surface 29 has a generally spherical curvature, and is bounded by the sides 27, which are more or less parallel to the axis of the mandrel 2. Each side 27, intersecting the ledge 26 inward from the shoulder 22 diameter, creates a recess 30 for the rivet tail 12. The head surface 29 extends radially outwardly, terminating in two diametrically spaced expansion lips or protrusions 28 that extend radially beyond the diameter of the shoulder 22. The radius of curvature of the end surface 29 is considerably greater than the maximum radius of the shoulder and also is greater than the radius of the expansion lips 28. Thus, the curvature of the end surface 29 gradually decreases to the radius of the expansion lips forming a circular curvature concentric with the shoulder. The diameter of the expansion lips is approximately equal to the outside diameter of the rivet sleeve 4. The axial height of the head 24 beyond the shoulder is about one-half the shorter dimension of the head and about one-third of the diameter of the longer dimension of the head. Another relationship that can be stated is that the diameter between the expansion lips is about two-thirds of the diameter of curvature of the head surface 29.

Prior to installation, the mandrel 2 is inserted into the bore 7 of the rivet 4 until the shoulder 22 engages the rivet tail 12. The outer diameters of the ribs forming the grooves or serrations 19 are slightly larger (perhaps about 0.002 inch) than the inner diameter of the rivet bore 7 adjacent the tail of the sleeves such that there is an interference or friction fit between the two components. This is desirable to keep them together during handling prior to installation. Also, the right end 21 of the bore 7 in the sleeve 4 has a reduced diameter (preferably about .003 inch) with respect to the adjacent tail end of the bore.

Figure 5:
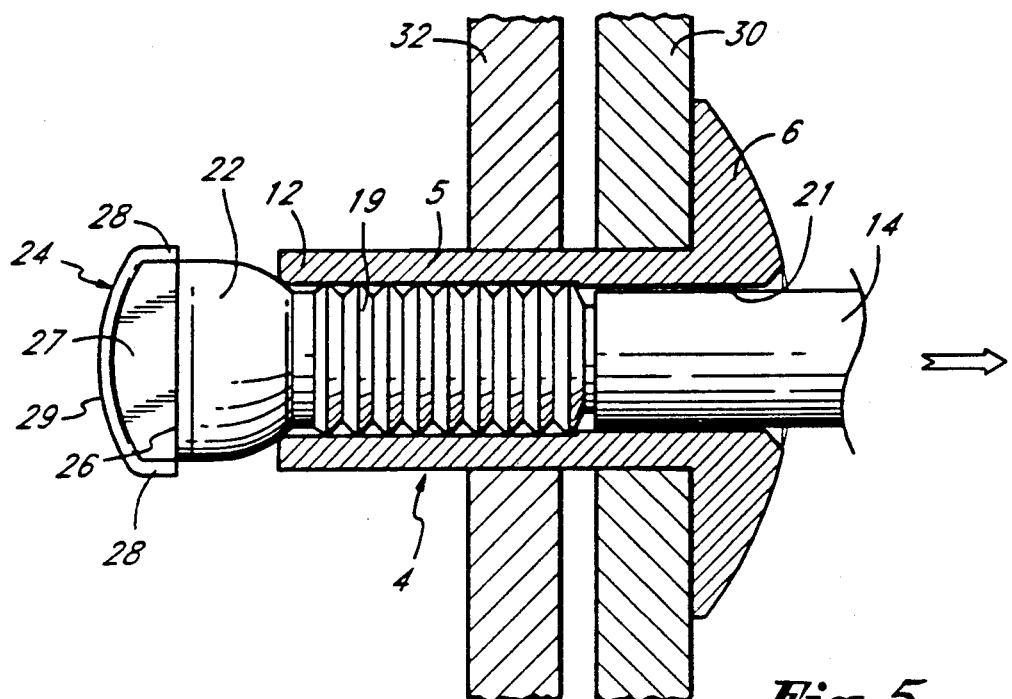
FIG. 5 is a sectionalized side view of a portion of the fastener of FIG. 1 installed in a workpiece but before being set.

With the mandrel inserted within the rivet body, the stem 14 extends substantially from the rivet head 6 and is inserted into a standard installation tool (not shown), where the serrations 16 are engaged by clamping jaws of the installation tool. The rivet assembly is shown in FIG. 5 installed in aligned holes in workpieces 30 and 32, which are to be joined by the fastener. The fastener is inserted until the face 8 of the rivet 4 is flush with the upper surface of the plate 30. These being blind rivets, in a typical situation, only one of the components being assembled is accessible, or visible. Thus, in the arrangement shown, the rivet is inserted from the right side of FIG. 5 on top of FIG. 9. During installation, the nose of the tool presses against the rivet head 6 while a pulling force is applied to the mandrel 2. The mandrel shoulder 22 is thus drawn into the sleeve tail 12.

Figure 6:
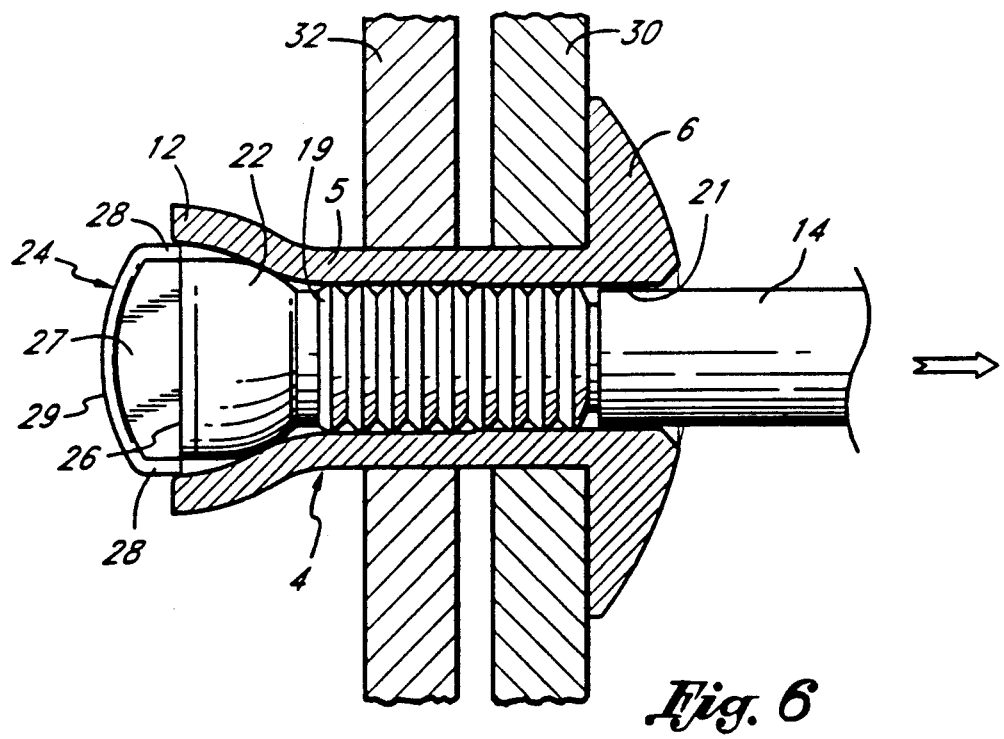
FIG. 6 is a cut-away side view of a portion of the fastener of FIG. 5 partially set in a workpiece.

FIG. 6 shows the stem shoulder 22 drawn partially into the sleeve tail 12, the spherical curvature of the shoulder gradually enlarging the sleeve tail. This, in turn, causes the exterior of the enlarging tail to press against the lower side of the plate 32. If the plates 30 and 32 are separated with any gap, the expansion of the sleeve on the blind side will force the plates together, or to clamp up. This clamp-up action is facilitated by the spherical shape of the shoulder and provides better clamp up than fasteners having a more abrupt shoulder, for instance.

FIG. 6 also illustrates the expansion lips 28, starting into the sleeve tail 12. As the shoulder 22 is drawn into the sleeve tail, the tail is enlarged but it retains its cylindrical shape. When the expansion lips are drawn into the tail, the tail is further deformed outwardly, but only in the area engaged by the expansion lips. This may be seen in FIG. 7, wherein the head 24 has been drawn fully into the sleeve tail. The recesses 30 adjacent to and between the expansion lips 28 accommodate this enlarging of the tail by the expanding lips 28 by providing a space into which the adjacent sleeve sections may curl inwardly, as seen in FIG. 8, which is viewed 90° from FIG. 7. This results in the sleeve tail 12 being formed into a generally elliptical shape, as seen in FIG. 9, enclosing the head 24. This closure prevents the mandrel from falling out of the installed fastener. Since the workpieces 30 and 32 have been clamped together, and since the shoulder does not enter the workpiece, increased pulling load on the mandrel stem will cause it to break at the break groove 20, approximately flush with the exterior of the rivet head 6.

The excellent clamp-up ability of the fastener is illustrated by comparing FIGS. 10a and 10b. The workpieces 30 and 32, in the form of test plates, are initially spaced as shown in FIG. 10a, and the fastener is capable of drawing the plates together and maintaining them in this position, as illustrated in FIG. 10b. In actual tests, prior art fasteners referred to as an N-rivet and a Q-rivet, both made by the assignee of the subject application, exerted only about 40 pounds on the spaced test plates before they failed to bring the plates any further together. The fastener of the present invention exerted at least 85 pounds, more than double, when it brought the plates fully together. Once together, the plates are maintained in this position and the stem is captured in the sleeve.

Tests to push the mandrel head out of the installed rivet have been conducted in comparison with the N-rivet. This showed that the peak load required to push the mandrel head of the present invention out of the sleeve was found to be about double the value for the N-rivet. These stem retention results are, of course, very desirable and were surprising since the N-rivet provides a somewhat elliptical shaped end on the installed sleeve tail.

In addition to the retention provided by the elliptical sleeve end, there is the frictional retention provided by the serrations 19 and the sleeve 4. As noted above, the internal diameter 21 of the sleeve head 6 is slightly smaller than the rest of the sleeve internal diameter. In a prototype product, the initial outer diameter of the ribs 19 is about 0.005 inches greater than the inner diameter of the sleeve head end section 21. Thus, as the stem ribs 19 are drawn further into the reduced diameter head section 21, additional strong stem retention is obtained. There can be some spring back force when the stem breaks at the break groove. Without interference between the stem and the sleeve, the stem might move axially a slight amount even though captured by the sleeve tail. However, the interference between the sleeve and the stem prevents such movement. The techniques of increased interference between the stem and a reduced diameter bore in the area of the sleeve head is of course useful with mandrels of various head configurations. While the interference means provided by serrations or ribs may take various forms, the annular ribs are particularly desirable because they seem to best resist axial stem withdrawal when the fastener is subjected to maximum shear forces.

Some other aspects of the mandrel head that are believed to be important are its strength and ease of manufacture. It has been found that the shoulder and head on the mandrel may be made with two steps on a heading apparatus, that is the end of a cylindrical mandrel tail is positioned in appropriately shaped dies having recesses shaped to provide the shoulder and head illustrated in the drawings. The tail forming lips 28, made as simple flat flanges without the rearwardly facing spherical surface of the head, are believed to be less desirable from the standpoint of providing sufficient mass to provide the necessary strength to properly deform the sleeve tail. Further, the two-step heading process is quite efficient and helps minimize the cost of fabrication.

Thus, there has been illustrated and described an inexpensive two-piece fastener having excellent clamp-up capability, as well as stem retention. While the preferred form of the invention has been illustrated, various alternatives are possible and fall within the scope of the invention.

It is claimed:

1. A blind fastener, including a tubular rivet body for extending through a workpiece, a stem extending through said rivet body having an enlarged portion on one end which is larger than the inner diameter of the tail of said body, the improvement wherein:

said stem portion has a forward facing shoulder which is adapted to engage and enlarge said body tail and draw the workpieces together as the stem portion is drawn towards a workpiece during the fastener setting operation, said stem portion further has a head with outwardly extending, spaced deforming lips to the rear of said shoulder which have a diameter larger than said shoulder so that when said lips engage said body tail, they further enlarge the body tail in the area of engagement, said lips extending circumferentially about only a portion of said stem head so that the enlargement of said body tail formed by said lips cause said tail to enlarge in diameter in one transverse direction, said stem head to the rear of said lips being formed to permit portions of said body tail between said lips to deform inwardly sufficiently far to capture the stem head so that it does not dislodge rearwardly out of the rivet body.

2. The fastener of claim 1, wherein the rear of said stem head is formed to produce a generally elliptical cross section in the tail of the rivet body, with the smaller diameter of such cross section being sufficiently small to prevent the stem tail from moving rearwardly after the rivet is set.

3. The fastener of claim 2, wherein said shoulder has a convex configuration.

4. The fastener of claim 3, wherein said convex configuration has a substantially spherical curvature.

5. The fastener of claim 1, wherein said lips are on opposite sides of the stem head and include an outer and rearwardly extending surface that has a convex configuration and extends between said opposite sides.

6. The fastener of claim wherein said head includes a pair of recesses that extend circumferentially between said lips and are separated by a head portion that extends diametrically between said lips and includes a convex rearwardly facing surface.

7. The fastener of claim 6, wherein the width of said head portion is slightly greater than the diameter of said stem.

8. The fastener of claim 6, wherein said head portion convex rearwardly facing surface has generally a spherical configuration, and the radius of curvature of said lips concentric with said stem is about two-thirds the radius of curvature of said rearwardly facing surface of said convex head portion.

9. The fastener of claim 1, wherein said stem diameter includes portions within the rivet body which are slightly larger than the interior diameter of said rivet body so that friction between the two components is maintained and must be overcome to separate the components.

10. The fastener of claim 9, wherein the rivet body inner diameter in the area of a head on said rivet is reduced relative to the area between said reduced area and the rivet tail so that the frictional interference between the components is increased as the rivet is set in a workpiece.

11. The fastener of claim 10, wherein the portion of said stem in said body has a plurality of annular grooves that enhance the axial holding forces between the stem and the rivet body.

12. A blind fastener, comprising:
  a tubular rivet body adapted to fit through a hole in a workpiece, said body having a head to be positioned on one side of the workpiece and a tail to be positioned on the other side of the workpiece; and
  an elongated stem extending through said body having an enlarged shoulder and head on one end, said shoulder sloping outwardly from said body to a generally circular cross-sectional shape facing the body tail, the outer radius of said shoulder being sufficiently larger than the inner radius of the body tail so that the body tail is enlarged outwardly when the stem is drawn in the direction to urge the stem shoulder to engage and enlarge the sleeve tail, said stem head including diametrically spaced deforming lips adjacent the shoulder which provide a generally elliptical shape wherein the larger dimension of said elliptical shape extends beyond the outer diameter of said shoulder in position to further engage and deform the tail when the stem is drawn to the position where said lips engage the tail, said head smaller dimension having an outer diameter no greater than that of the adjacent shoulder, and said head sloping inwardly in a rearward direction so that when said lips engage said body end, the body end is deformed into a somewhat elliptical shape and the rear edge of said deformed body end curves inwardly to capture the stem head within the deformed body end.

* * * * *

UNITED STATES PATENT AND TRADEMARK OFFICE
CERTIFICATE OF CORRECTION

PATENT NO. : 5,102,274

DATED : April 7, 1992

INVENTOR(S) : Norton, et al

It is certified that error appears in the above-identified patent and that said Letters Patent is hereby corrected as shown below:

Column 1, line 59, change "3,073,205-discloses" to -- 3,073,205-Siebol--.

Column 3, line 38, change "after and joining" to --after installation and joining--.

Column 6, line 64, change "the fastener..." to --fastener of Claim 1--.

Signed and Sealed this

Twentieth Day of July, 1993

Attest:

MICHAEL K. KIRK

*Attesting Officer*     *Acting Commissioner of Patents and Trademarks*